United States Patent [19]
Oishi et al.

[11] Patent Number: 4,549,922
[45] Date of Patent: Oct. 29, 1985

[54] METHOD OF MAKING MAGNETIC DISK CARTRIDGE

[75] Inventors: Kengo Oishi; Osamu Suzuki, both of Odawara, Japan

[73] Assignee: Fuji Photo Film Co., Ltd., Tokyo, Japan

[21] Appl. No.: 605,795

[22] Filed: May 1, 1984

[30] Foreign Application Priority Data

May 2, 1983 [JP] Japan ................... 58-77793

[51] Int. Cl.⁴ ............ B29C 19/00; B32B 31/00;
B29D 3/00; G11B 5/82
[52] U.S. Cl. ............................. 156/293; 156/297;
156/299; 156/303.1; 156/514; 156/563; 269/47;
269/54.5; 360/133; 360/135; 428/65; 428/694;
428/900
[58] Field of Search .................. 156/293–294,
156/299, 303.1, 297, 514, 563; 269/47, 54.5;
360/133, 135; 428/64–65, 694, 192, 900;
427/137

[56] References Cited

U.S. PATENT DOCUMENTS

| 2,720,923 | 10/1955 | Gustafson | 269/47 |
| 4,149,207 | 4/1979 | Porter, Jr. | 360/133 |
| 4,152,739 | 5/1979 | DeMoss | 360/133 |
| 4,175,274 | 11/1979 | Mann | 360/133 |

Primary Examiner—Edward Kimlin
Assistant Examiner—Merrell C. Cashion, Jr.
Attorney, Agent, or Firm—Pasquale A. Razzano

[57] ABSTRACT

Guide bars are positioned to define the center of a magnetic recording medium by contacting the inner circumference of a circular hole of the magnetic recording medium. Through holes are positioned in a medium grasping portion of a lower hub at equal distances from the center of the lower hub. The guide bars are inserted into the through holes of the lower hub and engaged with the inner circumference of the circular hole of the magnetic recording medium mounted on the lower hub. The end portions of the guide bars are then pushed by an upper hub to which a double-faced adhesive member is secured, thereby moving said guide bars away from the surface of the magnetic recording medium and securing the double-faced adhesive member to the magnetic recording medium and the lower hub.

7 Claims, 2 Drawing Figures

U.S. Patent  Oct. 29, 1985  4,549,922
F I G. 1
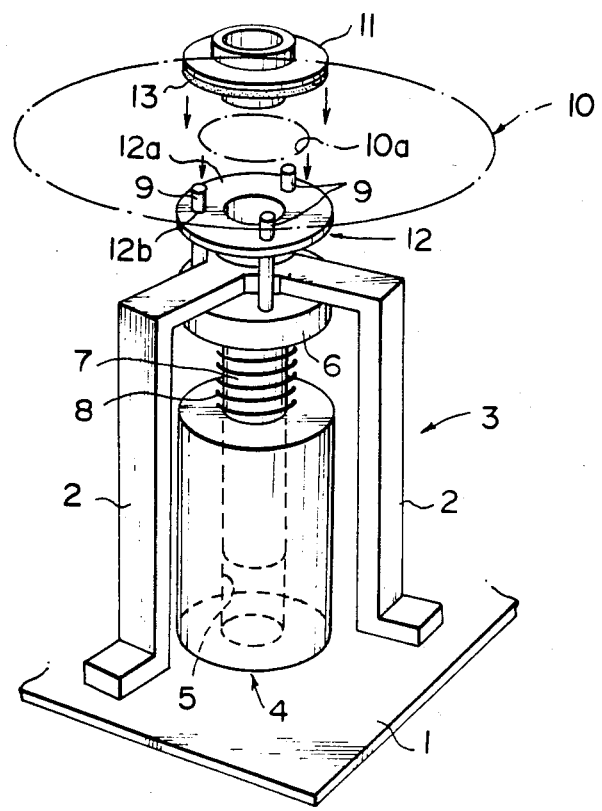
F I G. 2
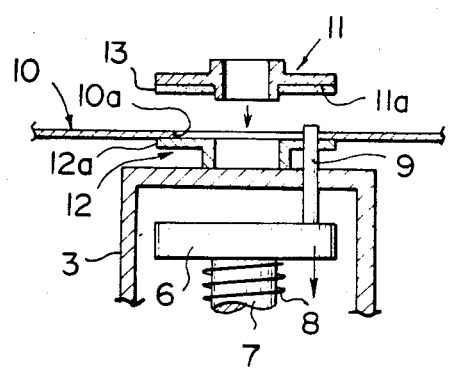

METHOD OF MAKING MAGNETIC DISK CARTRIDGE

BACKGROUND OF THE INVENTION

1. Field of the Invention

This invention relates to a method of making a magnetic disk cartridge. This invention particularly relates to a method of making a magnetic disk cartridge comprising a small-diameter, very thin magnetic disk which is rotated at a high speed for recording and reproducing of image information or the like.

2. Description of the Prior Art

Floppy disks are widely used as recording media for computers because they are easy to handle and low in cost. The floppy disk comprises a disk-like base made of a flexible polyester sheet or the like, and magnetic material layers overlaid on opposite surfaces of the disk-like base. The floppy disk is rotated at a high speed for magnetically recording information in the magnetic material layers by use of a magnetic head.

On the other hand, by utilizing the aforesaid advantages of floppy disks and the advantages that a magnetic recording medium has over a silver halide photographic films in that the magnetic recording medium can be reused, it has been proposed to use a magnetic disk having a size smaller than the size of the floppy disks as an image recording medium in still cameras. The magnetic disk used for still cameras comprises a small-diameter, very thin magnetic recording medium, and a hub secured to the center of the magnetic recording medium. The magnetic disk is rotatably housed in a small-size, hard case provided at the center thereof with a hub hole for exposing the hub of the magnetic disk. The case also has magnetic head insertion apertures for exposing a part of the magnetic disk in the front surface and the rear surface of the case. The combination of the magnetic disk with the case is called a magnetic disk cartridge.

When the aforesaid magnetic disk cartridge is manufactured, it is necessary to secure the flexible magnetic recording medium to the hub. Conventionally, the step of securing the flexible magnetic recording medium to the hub has been carried out by one or the other of two methods as described below. In the first method, the magnetic recording medium is secured to the hub by ultrasonic fusion. However, in this method, since the cartridge of this type is made very small as described above, the area available for fusion of the magnetic recording medium with the hub becomes very small, and the magnetic recording medium and the hub are readily separated from each other during use of the cartridge. In the second method, a double-faced adhesive member comprising, for example, an nonwoven fabric and adhesive layers overlaid on opposite surfaces of the nonwoven fabric is positioned between the magnetic recording medium and the hub to secure the magnetic recording medium and the hub to each other.

In the case where the second securing method as described above is used, the hub is divided into an upper hub and a lower hub. The lower hub, the magnetic recording medium, the double-faced adhesive member, and the upper hub are positioned in this order from the bottom. Thus the upper hub and the magnetic recording medium are secured to each other by the double-faced adhesive member, and the upper hub and the lower hub are secured to each other by the double-faced adhesive member via a circular hole at the center of the magnetic recording medium. Or, the hub is fabricated integrally, and secured to the magnetic recording medium by the double-faced adhesive member. In any case, since the components of the cartridge are very small and since the magnetic recording medium is flexible, it is not always possible to secure the magnetic recording medium and the hub or hubs concentrically to each other.

SUMMARY OF THE INVENTION

The primary object of the present invention is to provide a method of making a magnetic disk cartridge, wherein a disk-like magnetic recording medium and a hub are securely fixed concentrically to each other.

Another object of the present invention is to provide a method of making a magnetic disk cartridge, wherein a magnetic recording medium and a hub are reliably aligned with each other in a simple manner by use of a simple apparatus.

The specific object of the present invention is to provide a method of making a magnetic disk cartridge, which improves the productivity and the quality of the magnetic disk cartridge.

The above objects are accomplished by a method of making a magnetic disk cartridge by positioning a disk-like magnetic recording medium provided at the center with a circular hole between an upper hub and a lower hub concentrically to said upper hub and said lower hub, and fixing said upper hub, said lower hub and said magnetic recording medium to each other by use of a double-faced adhesive member positioned between said upper hub and said magnetic recording medium, wherein the improvement comprises:

(i) positioning at least three guide bars for axial movement, said guide bars being projected so as to define the center position of said magnetic recording medium by contacting the inner circumference of said circular hole of said magnetic recording medium, (ii) positioning through holes in a medium grasping portion of said lower hub for engagement with a disk rotating shaft of a recording and reproducing apparatus, said through holes being adapted for tight insertion of said guide bars thereinto and positioned at equal distances from the center of said lower hub, (iii) inserting said guide bars into said through holes of said lower hub and supporting said lower hub on said guide bars, (iv) engaging the inner circumference of said circular hole of said magnetic recording medium with said guide bars and mounting said magnetic recording medium on said lower hub, and (v) thereafter pushing the end portions of said guide bars by said upper hub to which a double-faced adhesive member is secured, thereby moving said guide bars away from the surface of said magnetic recording medium and securing said double-faced adhesive member to said magnetic recording medium and said lower hub.

In the method of the present invention, when the inner circumference of the circular hole at the center of the magnetic recording medium is contacted with the three or more guide bars, the center of the magnetic recording medium is positioned at equal distances from the guide bars. Therefore, when the magnetic recording medium and the lower hub having the through holes for insertion of the guide bars thereinto positioned at equal distances from the center of the lower hub are together engaged with the guide bars, the center of the magnetic recording medium and the center of the lower hub are reliably aligned with each other. The magnetic recording medium and the lower hub are maintained in the aligned condition, and then the upper hub, the magnetic recording medium and the lower hub are secured together by the double-faced adhesive member. Thus it is possible to obtain a magnetic disk in which the center of the magnetic recording medium is reliably aligned with the center of the lower hub.

In the present invention, the alignment of the magnetic recording medium with the lower hub can be reliably achieved in a simple manner by use of a simple apparatus. Thus the present invention markedly improves the productivity and quality of the magnetic disk cartridge.

BRIEF DESCRIPTION OF THE DRAWINGS

FIG. 1 is a perspective view showing an embodiment of the apparatus for carrying out the method of making a magnetic disk cartridge in accordance with the present invention, and FIG. 2 is a sectional side view showing a part of the apparatus of FIG. 1.

DESCRIPTION OF THE PREFERRED EMBODIMENTS

The present invention will hereinbelow be described in further detail with reference to the accompanying drawings.

Referring to FIG. 1, a lower hub receiving stand 3 having three legs 2 is fixed to a base plate 1. Within the lower hub receiving stand 3, a holding base 4 is fixed to the base plate 1. The holding base 4 is provided at the center portion thereof with a vertically extending slide hole 5. Into the slide hole 5 is fitted a rod 7 slidably in the vertical direction. The upper end of the rod 7 is secured to the bottom of a guide bar supporting base 6. A coil spring 8 is positioned around the periphery of the rod 7 between the holding base 4 and the guide bar supporting base 6. By way of example, three guide bars 9 are projected from the upper surface of the guide bar supporting base 6.

The guide bars 9 are positioned in spaced relation to one another so that they come into contact with the inner circumference of a circular hole 10a perforated at the center of a disk-like magnetic recording medium 10 constituting the magnetic disk. Thus the guide bars 9 prevent the magnetic recording medium 10 from moving in the plane normal to the axial direction of the guide bars 9. That is, the guide bars 9 define the center position of the magnetic recording medium 10.

The magnetic recording medium 10 comprises a very thin base, e.g. a polyester sheet having a thickness of 50μ or less, and magnetic material layers overlaid on opposite surfaces of the base by coating, deposition, sputtering, or the like.

The method of assembling the magnetic disk by use of the aforesaid apparatus will hereinafter be described. A lower hub 12 made, for example, of a plastic material for grasping and securing the magnetic recording medium 10 between the lower hub 12 and an upper hub 11 at the center portions thereof has a disk-like medium grasping portion 12a. The medium grasping portion 12a is provided with three through holes 12b for closely receiving the three guide bars 9. The three through holes 12b are positioned at equal distances from the center of the lower hub 12.

The lower hub 12 adapted to be supported on the disk rotation shaft of, for example, a still camera is placed on the lower hub receiving stand 3 with the medium grasping portion 12a facing up and with the guide bars 9 inserted into the through holes 12b. For facilitating the assembling work, it is advantageous that the three guide bars 9 be positioned in equally spaced relation to one another. In this case, it becomes unnecessary to align specific guide bars 9 with specific through holes 12b when the guide bars 9 are inserted into the through holes 12b.

Thereafter, as shown in FIG. 2, the magnetic recording medium 10 is placed on the lower hub 12 with the circular hole 10a engaging with the three guide bars 9 projecting upwardly from the medium grasping portion 12a of the lower hub 12. Then, the upper hub 11 provided with a double-faced adhesive member 13 secured to a medium grasping surface 11a of the upper hub 11 is pushed under pressure onto the magnetic recording medium 10 from above. As a result, the guide bars 9 are pushed down, i.e. the rod 7 is slid downwardly in the slide hole 5 against the force of the coil spring 8. Thus the guide bars 9 are retracted from the surface of the magnetic recording medium 10. In this manner, the portion of the double-faced adhesive member 13 near the outer circumference thereof is secured to the magnetic recording medium 10, and the portion of the double-faced adhesive member 13 near the inner circumference thereof is secured to the lower hub 12. Thus the upper hub 11, the magnetic recording medium 10, and the lower hub 12 are secured integrally with one another.

As mentioned above, the component directly supported by the disk rotation shaft of the recording and reproducing apparatus is the lower hub 12. Therefore, for the magnetic recording medium 10 to be correctly rotated around the center thereof, the lower hub 12 and the magnetic recording medium 10 must be correctly secured concentrically with each other. In the method as described above, since the circular hole 10a of the magnetic recording medium 10 contacts the three guide bars 9, the center of the magnetic recording medium 10 is positioned at equal distances from the guide bars 9. Also, the through holes 12b of the lower hub 12 are positioned at equal distances from the center of the lower hub 12. Therefore, the center of the magnetic recording medium 10 engaging with the guide bars 9 matches the center of the lower hub 12. This condition is maintained until the double-faced adhesive member 13 is secured to the magnetic recording medium 10 and the lower hub 12. Accordingly, in the assembled magnetic disk, the center of the lower hub 12 and the center of the magnetic recording medium 10 coincide with each other.

In the embodiment as described above, three guide bars 9 are used. However, the number of the guide bars 9 is not limited to three. Thus the guide bars 9 may be installed in any number more than three insofar as the center of the magnetic recording medium 10 can be reliably defined.

We claim:

1. A method of making a magnetic disk cartridge by positioning a disk-like magnetic recording medium provided at the center with a circular hole between an upper hub and a lower hub concentrically to said upper hub and said lower hub, and fixing said upper hub, said lower hub and said magnetic recording medium to each other by use of a double-faced adhesive member positioned between said upper hub and said magnetic recording medium, wherein the improvement comprises:

(i) positioning at least three guide bars resiliently mounted for axial movement, said guide bars being projected so as to define a circle circumscribed thereabout having the diameter of said circular hole and centering said magnetic recording medium by contacting the inner circumference of said circular hole of said magnetic recording medium with said guide bars, (ii) providing a plurality of through holes in a medium-grasping portion of said lower hub, the latter serving for engagement with a disk-rotating shaft of a recording and reproducing apparatus, said through holes being dimensioned for tight insertion of said guide bars thereinto and positioned at equal distances from the center of said lower hub, (iii) inserting said guide bars into said through holes of said lower hub and supporting said lower hub on said guide bars, (iv) engaging the inner circumference of said circular hole of said magnetic recording medium with said guide bars to center said magnetic recording medium relative to said lower hub and mounting said magnetic recording medium on said lower hub, and (v) thereafter pushing the end portions of said guide bars by lowering said upper hub to which said double-faced adhesive member is secured, thereby moving said guide bars away from the surface of said magnetic recording medium and securing said double-faced adhesive member to both said magnetic recording medium and said lower hub.

2. A method as defined in claim 1 wherein said guide bars are positioned on a supporting base urged by a spring member to project said guide bars from said through holes of said lower hub and from said circular hole of said magnetic recording medium.

3. A method as defined in claim 1 wherein said guide bars are positioned in equally spaced relation to one another.

4. A method as defined in claim 1 wherein said medium grasping portion of said lower hub has a disk-like shape.

5. A method as defined in claim 1 wherein said double-faced adhesive member secured to said upper hub has a ring-like shape.

6. A method as defined in claim 5 wherein the portion of said ring-like double-faced adhesive member near the outer circumference thereof is secured to said magnetic recording medium, and the portion of said ring-like double-faced adhesive member near the inner circumference thereof is secured to said lower hub.

7. A method as defined in claim 1, further comprising removing the assembly formed of said medium, said lower hub and said upper hub from said guide bars.

* * * * *